US012604232B2

(12) United States Patent
Parkar et al.

(10) Patent No.: US 12,604,232 B2
(45) Date of Patent: Apr. 14, 2026

(54) SYSTEM AND METHOD FOR REDUCING CONGESTION IN MESH NETWORK

(71) Applicant: SPINTLY INC., Milpitas, CA (US)

(72) Inventors: Rohin Parkar, Ponda (IN); Aniket Shet, Bicholim (IN); Mohinish Naik, Cortalim (IN); Malcolm Dsouza, Margao (IN)

(73) Assignee: SPINTLY INC., Milpitas, CA (US)

( * ) Notice: Subject to any disclaimer, the term of this patent is extended or adjusted under 35 U.S.C. 154(b) by 413 days.

(21) Appl. No.: 18/037,851

(22) PCT Filed: Nov. 19, 2021

(86) PCT No.: PCT/IN2021/051083
§ 371 (c)(1),
(2) Date: May 19, 2023

(87) PCT Pub. No.: WO2022/107169
PCT Pub. Date: May 27, 2022

(65) Prior Publication Data
US 2024/0007897 A1    Jan. 4, 2024

(30) Foreign Application Priority Data
Nov. 19, 2020    (IN) ............................. 202021038166

(51) Int. Cl.
| | |
|---|---|
| *H04W 28/02* | (2009.01) |
| *H04W 40/28* | (2009.01) |
| *H04W 84/18* | (2009.01) |

(52) U.S. Cl.
CPC ... *H04W 28/0236* (2013.01); *H04W 28/0289* (2013.01); *H04W 40/28* (2013.01); *H04W 84/18* (2013.01)

(58) Field of Classification Search
CPC ......... H04W 28/0236; H04W 28/0289; H04W 40/28; H04W 84/18
See application file for complete search history.

(56) References Cited

U.S. PATENT DOCUMENTS

| | | | |
|---|---|---|---|
| 8,605,579 B2 | 12/2013 | Abraham et al. | |
| 2008/0159207 A1* | 7/2008 | Levine ................. | H04W 16/14 |
| | | | 370/401 |
| 2015/0173111 A1* | 6/2015 | Agarwal ................ | H04W 8/04 |
| | | | 370/329 |

(Continued)

*Primary Examiner* — Ajay Cattungal
(74) *Attorney, Agent, or Firm* — Jose Cherson Weissbrot

(57) ABSTRACT

A system (100) to reduce congestion in an access control wireless mesh network, the system (100) comprising: a plurality of nodes (102) such that each node of the plurality of nodes (102) is coupled to one or more neighbouring nodes, and configured to store a mapping between a plurality of credentials associated with each neighbouring node of the one or more neighbouring nodes; and control circuitry (104) that is coupled to the plurality of nodes (102), and configured to: transmit a read request to each node of the plurality of nodes (102); receive, in response to the read request, from each node of the plurality of nodes (102), the plurality of credentials associated with the one or more neighboring nodes; generate a node mapping based on the received plurality of credentials; and generate a routing path for each node of the plurality of nodes (102) based on the node mapping.

19 Claims, 2 Drawing Sheets

200

(56)                    References Cited

U.S. PATENT DOCUMENTS

2015/0257081 A1*    9/2015  Ramanujan ........... H04L 45/125
                                                        370/329
2017/0155580 A1*    6/2017  Ramanujan ............. H04L 45/74
2018/0359678 A1*   12/2018  Jones .................... H04W 40/12
2019/0116504 A1*    4/2019  Rusackas .............. H04L 43/045
2019/0386969 A1*   12/2019  Verzun ................. G06F 21/606
2020/0052997 A1*    2/2020  Ramanathan .......... H04L 45/20
2020/0220953 A1*    7/2020  Wu ....................... H04W 72/12
2021/0022207 A1*    1/2021  Hans .................... H04W 8/005
2021/0297836 A1*    9/2021  Padgett ................. H01Q 1/273

* cited by examiner

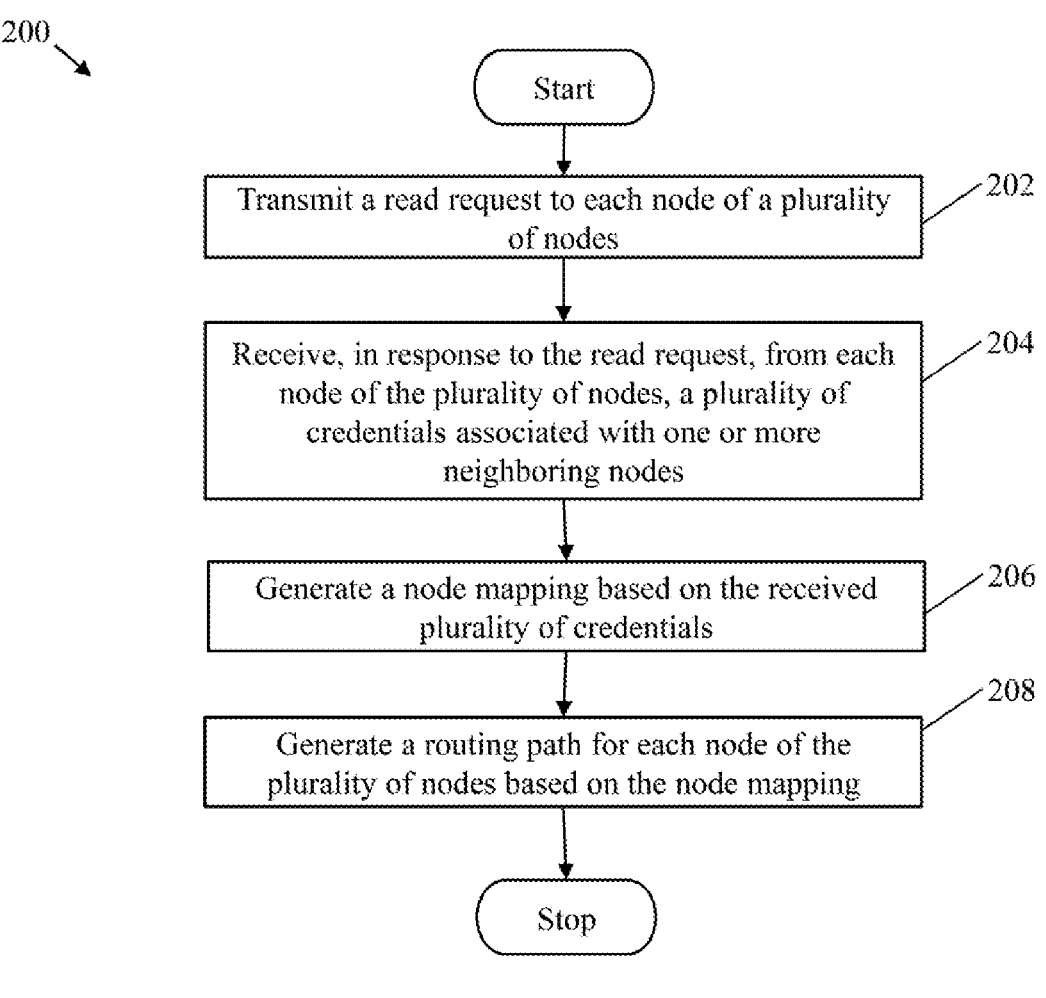

200

Start

Transmit a read request to each node of a plurality of nodes — 202

Receive, in response to the read request, from each node of the plurality of nodes, a plurality of credentials associated with one or more neighboring nodes — 204

Generate a node mapping based on the received plurality of credentials — 206

Generate a routing path for each node of the plurality of nodes based on the node mapping — 208

Stop

FIG. 2

SYSTEM AND METHOD FOR REDUCING CONGESTION IN MESH NETWORK

FIELD OF INVENTION

The present invention relates to the field of management of congestion in a mesh network and more particularly, a system and method for reducing the congestion in the mesh network.

BACKGROUND OF THE INVENTION

Access control devices typically includes a controller component, a reader, and an actuator component. The controller component performs an authentication and decision logic for granting access. The reader reads the authentication data and sends it to the controller for authentication. The actuator component consists of mechanically and/or electro-mechanically operating parts. The actuator is controlled by the controller based on the decision logic.

In traditional access control devices, the readers include a keypad and display unit for entering in authentication codes and/or swipe card to acquire the authentication codes. The controller then takes decisions for granting access based on a local database of authorized users present in its memory or connects to the internet to authenticate users.

As an improvement, the access control devices started employing wireless technologies for authorization in a contactless and proximity-based context. One such wireless technology is Radio Frequency Identification (RFID) that has mostly been the predecessor to most of the technologies in the wireless authorization domain. Near-Field Communication (NFC) is also a wireless technology, but it has been used with the lower range as compared to RFID. The RFID technology has served the purpose of medium range based directional context for authorization, whereas NFC has served the purpose for proximity context-based authorization.

However, all such systems require a local area network (LAN) cable connection between each of the readers, the controller and another cable between the controller and the actuator. For a typical organization consisting of numerous doors, the amount of wiring needed can be overwhelming.

To avoid the above problems, flooding mesh may be employed with the access control devices. However, the flooding mesh may lead to congestions in the network, which may cause poor user experience. In addition, the currently used method involves the requirement of prior knowledge of the geography of the place of installation and manual configuring depending on the placement of nodes.

There is therefore a need in the art for system and method, which overcome above-mentioned and other limitations of existing approaches.

SUMMARY

Embodiments of the present disclosure provides a system to reduce congestion in an access control wireless mesh network, the system comprising: a plurality of nodes such that each node of the plurality of nodes is coupled to one or more neighbouring nodes, and configured to store a mapping between a plurality of credentials associated with each neighbouring node of the one or more neighbouring nodes; and control circuitry that is coupled to the plurality of nodes, and configured to: transmit a read request to each node of the plurality of nodes; receive, in response to the read request, from each node of the plurality of nodes, the plurality of credentials associated with the one or more neighboring nodes; generate a node mapping based on the received plurality of credentials; and generate a routing path for each node of the plurality of nodes based on the node mapping.

In some embodiments, the mapping between the plurality of credentials comprises a Received Signal Strength Indicator (RSSI) mapped with a node address of each neighbouring node of the one or more neighbouring nodes.

In some embodiments, each node of the plurality of nodes is configured to retrieve the node address of each neighbouring node of the one or more neighbouring nodes.

In some embodiments, the control circuitry is further configured to generate and transmit a first initiation signal to each node of the plurality of nodes, and in response to the first initiation signal, each node of the plurality of nodes retrieves the node address of each neighbouring node of the one or more neighbouring nodes.

In some embodiments, the control circuitry is further configured to determine, based on the node mapping, a hop count and a response time associated with each node of the plurality of nodes.

In some embodiments, each node of the plurality of nodes is further configured to generate a query such that the query is transmitted multiple with a predefined hop count, wherein the predefined hop count is 1.

In some embodiments, each node of the plurality of nodes is configured to receive a health message generated by each neighboring node of the one or more neighboring nodes, wherein the health message comprises the node address and the RSSI associated with each neighboring node of the one or more neighboring nodes.

In some embodiments, each node of the plurality of nodes is configured to match the RSSI associated with the health message with the plurality of credentials stored in each node of the plurality of nodes.

In some embodiments, each node of the plurality of nodes is configured to generate an error signal based on a mismatch between the RSSI associated with the health message and the RSSI associated with the plurality of credentials.

In some embodiments, each node of the plurality of nodes is configured to generate an error signal when the health message is received after an expiration of a predefined time interval.

In some embodiments, the control circuitry is further configured to generate a second initiation signal based on the error signal, wherein the control circuitry is further configured to provide the second initiation signal to the corresponding node of the plurality of nodes.

In some embodiments, in response to the second initiation signal, the corresponding node of the plurality of nodes retrieves the node addresses of each neighbouring node of the one or more neighbouring nodes.

In some embodiments, the control circuitry is further configured to allocate a predefined time slot to each node of the plurality of nodes such that each node of the plurality of nodes communicates with the control circuitry (104) at the predetermined time slot.

In some embodiments, each node of the plurality of nodes is configured to generate and provide a time slot request for additional time slots, to the control circuitry.

In some embodiments, the control circuitry is further configured to allocate the additional time slots to each node of the plurality of nodes based on the time slot request.

In some embodiments, the control circuitry is further configured to allocate an output transmission power to each node of the plurality of nodes based on the generated node mapping.

Embodiments of the present disclosure provides a method to reduce congestion in an access control wireless mesh network. The method comprising steps of transmitting, by way of a control circuitry of a system, a read request to each node of the plurality of nodes; receiving, by way of the control circuitry, in response to the read request, from each node of the plurality of nodes, the plurality of credentials associated with the one or more neighboring nodes; generating, by way of the control circuitry, a node mapping based on the received plurality of credentials; and generating, by way of the control circuitry, a routing path for each node of the plurality of nodes based on the node mapping.

BRIEF DESCRIPTION OF THE DRAWINGS

Other objects, features, and advantages of the embodiment will be apparent from the following description when read with reference to the accompanying drawings. In the drawings, wherein like reference numerals denote corresponding parts throughout the several views:

The diagrams are for illustration only, which thus is not a limitation of the present disclosure, and wherein:

FIG. 2 illustrates a flowchart of a method for reducing congestion in the access control wireless mesh network using the system of FIG. 1, in accordance with an embodiment of the present disclosure.

To facilitate understanding, like reference numerals have been used, where possible to designate like elements common to the figures.

DETAILED DESCRIPTION OF THE PREFERRED EMBODIMENTS

Figure 1:
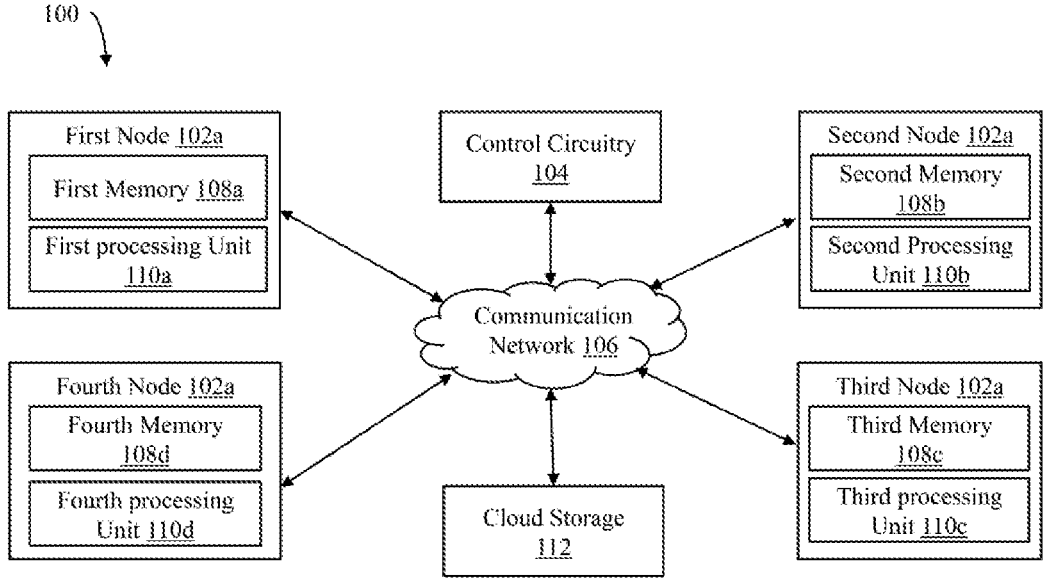
FIG. 1 is a block diagram that illustrates a system to reduce network congestion in a physical access control wireless mesh network, in accordance with an exemplary embodiment of the present disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

There remains a need for a system and method that provides way to reduce congestion in the mesh network.

Definitions

Bluetooth low energy (BLE) is a wireless personal area network that consumes less energy than bluetooth and possess larger area than bluetooth. Beacon is a hardware transmitter, which transmits BLE signal on its proximity.

The term "bluetooth low energy" and "BLE" and such other term defines bluetooth low energy and interchangeably used across the context.

Gateway is a software, or a hardware used in telecommunications for computer networks that allows data to flow from one discrete network to another. Gateway controls the flow of data packets across the network.

The term "gateway", "hub" and "controller" and other such term defines gateway and interchangeably used across the context.

Cloud refers to servers that are accessed over the internet, and the software and databases that run on said servers. The cloud enables users to access the same files and applications from any device due to the computing and storage occurs on the servers in a data centre, instead of locally on the user device.

The term "cloud" and "central database" and other such term defines cloud and interchangeably used across the context.

Reader refers to the devices/virtual device that reads and authenticate data and sends the data to gateway for authentication.

The term "reader", "doors", "mesh nodes" and "scanner device" and other such term defines reader and interchangeably used across the context.

Throttling refers to the activity or process of limiting the bandwidth available to users of an electronic communication.

The present invention relates to wireless access control systems where all the devices in the network communicate over a communication network such as, but not limited to, Bluetooth Low Energy (BLE) mesh network unlike the earlier available systems which used wired interfaces like Wiegand, RS485 and so forth since the devices are unsupervised and unstable for longer execution. The wireless mesh allows devices to relay messages to the intended device over 2.45 GHz wireless frequencies.

FIG. 1 is a block diagram that illustrates a system (100) to reduce network congestion in a physical access control wireless mesh network, in accordance with an exemplary embodiment of the present disclosure. The system (100) may be configured to facilitate in reducing network congestion in the wireless mesh network working on a flooding method. The system 100 includes a plurality of nodes (102) of which first through fourth nodes (102a-102d) are shown, and control circuitry (104). As illustrated in FIG. 1, the block diagram depicts an exemplary representation of the wireless mesh network indicating network communication between the first through fourth nodes (102a-102d) and the control circuitry (104) by way of a communication network (106). The first through fourth nodes (102a-102d) and the control circuitry (104) are communicatively coupled to each other via the communication network (106). In other embodiments, the first through fourth nodes (102a-102d) and the control circuitry (104) can be communicably coupled through separate communication networks established therebetween. In an embodiment, the system (100) may be configured to enable communication between the first through fourth nodes (102a-102d) and the control circuitry (104) and in between the first through fourth nodes (102a-102d) in the wireless mesh network.

The communication network (106) may include suitable logic, circuitry, and interfaces that may be configured to provide a plurality of network ports and a plurality of communication channels for transmission and reception of data related to operations of various entities (such as the first through fourth nodes (102a-102d) and the control circuitry (104)) of the system 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network (106) may be associated with an application layer for implementation of communication protocols based on one or more communication requests from the first through fourth nodes (102a-102d) and the control circuitry (104). The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one embodiment, the communication data may be transmitted or received via at least one communication channel of a plurality of communication channels in the communication network (106). The communication channels may include a wireless channel. The wireless channel may be associated with a data standard which may be defined by one of a Bluetooth Low Energy (BLE) network, Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, and a combination thereof. Embodiments of the present invention are intended to include or otherwise cover any type of communication channel, including known, related art, and/or later developed technologies.

The first through fourth nodes (102a-102d) are distributed nodes of the wireless mesh network. In an embodiment, the first through fourth nodes (102a-102d) may represent first through fourth scanning devices that may be installed at first through fourth doors of a building. It will be apparent to a person skilled in the art that the plurality of nodes (102) is shown to include four nodes (i.e., the first through fourth nodes (102a-102d)) to make the illustrations concise and clear and should not be considered as a limitation of the present disclosure. In various other embodiments, the plurality of nodes (102) can include any number of nodes, without deviating from the scope of the present disclosure. In an example, the first through fourth nodes (102a-102d) (e.g., the first through fourth scanning devices) may include, but is not limited to, a near field communication reader, a biometric reader, a Radio Frequency Identifier (ID) reader, and the like. It will be apparent to a person skilled in the art that the first through fourth scanning devices can include any type of scanning devices, without deviating from the scope of the present disclosure. As the first through fourth scanning devices are located at the first through fourth nodes (102a-102d) of the wireless mesh network, therefore communication between the first through fourth scanning devices can be interchangeably referred to as communication between the first through fourth nodes (102a-102d) in the wireless mesh network. As illustrated in FIG. 1, the first through fourth nodes (102a-102d) includes first through fourth memories (108a-108d) and first through fourth processing units (110a-110d).

The first through fourth memories (108a-108d) may include suitable logic, instructions, circuitry, interfaces, and/ or codes to store credentials associated with one or more neighboring nodes of each node of the first through fourth nodes (102a-102d). Examples of the first through fourth memories (108a-108d) may include but are not limited to, a ROM, a RAM, a flash memory, a removable storage drive, a HDD, a solid-state memory, a magnetic storage drive, a PROM, an EPROM, and/or an EEPROM. Embodiments of the present invention are intended to include or otherwise cover any type of the first through fourth memories (108a-108d), including known, related art, and/or later developed technologies.

The first through fourth processing units (110a-110d) may include suitable logic, instructions, circuitry, interfaces, and/ or codes for executing various operations, such as the operations associated with the first through fourth nodes (110a-110d), or the like. In some embodiments, the first through fourth processing units (110a-110d) may be configured to control one or more operations performed by the first through fourth nodes (102a-102d) in response to an input received from the control circuitry (104). Examples of the first through fourth processing units (110a-110d) may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Embodiments of the present disclosure are intended to include or otherwise cover any type of the first through fourth processing units (110a-110d) including known, related art, and/or later developed technologies.

The control circuitry (104) may further represent another node of the wireless mesh network that may be configured to perform various operations associated with the system (100) such as mapping the plurality of nodes (102) wirelessly thus eliminating a requirement of pre knowledge of placements of the plurality of nodes (102) in the wireless mesh network. In some embodiments, the control circuitry (104) may be referred to as a gateway and/or a hub, without deviating from the scope of the present disclosure. In an embodiment, the first through fourth nodes (102a-102d) and the control circuitry (104) may be capable of relaying messages meant for other nodes within the wireless mesh network by way of the communication network (108) according to specifications of the wireless mesh network. In an example, the messages sent from the control circuitry (104) may not be able to reach to the first node (102a) in a single hop if the first node (102a) is out of the wireless mesh range (i.e., a communication range of the communication network (106)) of the control circuitry (104). In such scenario, the messages may be first sent to the third node (102c) and from the third node (102c), the messages may be relayed to the first node (102a) considering that the third node (102c) is in the wireless mesh range (i.e., a communication range of the communication network (106)) of both the control circuitry (104) and the first node (102a). Examples of the control circuitry (104) may include, but are not limited to, an ASIC processor, a RISC processor, a CISC processor, a FPGA, and the like.

The control circuitry (104) may be further configured to perform one or more operations associated with the system (100) by communicating one or more commands, messages and/or instructions over the communication network (106). For example, the control circuitry (104) may be configured to receive an input from a user. The user may be, but not limited to, a supervisor, a caretaker, a backend personnel, and the like. Further, the control circuitry (104) may be configured to generate a first initiation signal based on the input received from the user. In an example, the control circuitry (104) may be configured to transmit the first initiation signal to the first through fourth nodes (102a-102d) by way of the communication network (106).

The first through fourth processing units (110a-110d) of the first through fourth nodes (102a-102d) may be configured to receive the first initiation signal. Further, in response to the first initiation signal, the first through fourth processing units (110a-110d) may be configured to generate first through fourth query (QE1-QE4). Specifically, in response to the first initiation signal, the first processing unit (110a) may be configured to generate the first query (QE1). The first query QE1 may include an address associated with the first node (102a). Further, the second processing unit (110b) may be configured to generate the second query (QE1). The second query QE2 may include an address associated with the second node (102b). Furthermore, the third processing unit (110c) may be configured to generate the third query (QE3). The third query QE3 may include an address associated with the third node (102c). Furthermore, the fourth processing unit (110d) may be configured to generate the fourth query (QE4). The fourth query QE4 may include an address associated with the fourth node (102d).

The first through fourth processing units (110a-110d) of the first through fourth nodes (102a-102d) may be further configured to transmit the first through fourth query (QE1-QE4) multiple times in a group of nodes of the plurality of nodes (102) with a predefined hop count. Specifically, the first processing unit (110a) of the first node (102a) may be configured to transmit the first query (QE1) to one or more neighboring nodes (i.e., the second through fourth nodes (102b-102d)). Similarly, the second processing unit (110b) of the second node (102b) may be configured to transmit the second query (QE2) to one or more neighboring nodes (i.e., the first node (102a), the third node (102c), and the fourth node (102d)). Similarly, the third processing unit (110c) of the third node (102c) may be configured to transmit the third query (QE3) to one or more neighboring nodes (i.e., the first node (102a), the second node (102b), and the fourth node (102d)). Similarly, the fourth processing unit (110d) of the fourth node (102d) may be configured to transmit the fourth query (QE4) to one or more neighboring nodes (i.e., the first through third nodes (102a-102c)). In an embodiment, the predefined hop count associated with the transmission of the first through fourth query (QE1-QE4) may be equal to 1. In other words, the first through fourth nodes (102a-102d) may transmit the first through fourth queries (QE1-QE4) to those neighboring nodes to which the first through fourth queries (QE1-QE4) can reach in one single hop.

In an embodiment, the first through fourth processing units (110a-110d) of the first through fourth nodes (102a-102d) may be configured to retrieve the credentials associated with the node from which the query is received. Specifically, as the first through fourth nodes (102a-102d) are configured to transmit the first through fourth queries (QE1-QE4) to the nodes that are at one hop count away, therefore each of the first through fourth nodes (102a-102d) stores the credentials of one or more neighboring nodes that are at one hop count distance. In an embodiment, the first through fourth processing units (110a-110d) of the first through fourth nodes (102a-102d) may be configured to retrieve node addresses of each neighbouring node of the one or more neighbouring nodes that are at one hop count distance. In an embodiment, the first through fourth processing units (110a-110d) of the first through fourth nodes (102a-102d) may be configured to retrieve node addresses of each neighbouring node by way of a beacon (not shown), that may be configured to facilitate in retrieving the node addresses. The credentials may include the retrieved node addresses associated with the node from which the query is received, and a Received Signal Strength Indicator (RSSI) associated with the node from which the query is received. In other words, the first through fourth processing units (110a-110d) of the first through fourth nodes (102a-102d)

may be configured to retrieve the node addresses associated with the node from which the query is received, and the Received Signal Strength Indicator (RSSI) associated with the node from which the query is received. In an example, when the second node (102b) receives the first query (QE1) from the first node (102a) which is at one hop count distance from the second node (102b), the second node (102b) may be configured to retrieve the node address associated with the first node (102a) and the RSSI associated with the first node (102a). Further, the second node (102b) may be configured to store a mapping between the node addresses associated with the first node (102a) and the RSSI associated with the first node (102a) in a look up table (LUT) of the first memory (108a). Similarly, the second node (102b) may be configured to store a mapping between the address associated with each node from which a query is received. It will be apparent to a person skilled in the art that the foregoing discussion is explained with an assumption that the first node (102a) transmits the first query (QE1) to the second node (102b) to make the illustrations concise and clear and should not be considered as a limitation of the present disclosure. In various other embodiments, the first through fourth nodes (102a-102d) can transmit the first through fourth query (QE1-QE4) to any of the first through fourth nodes (102a-102d).

The control circuitry (104) may be further configured to generate a read signal. Further, the control circuitry (104) may be configured to transmit the read signal to the first through fourth nodes (102a-102d). In an embodiment, in response to the read signal, the control circuitry (104) may be configured to receive the credentials stored in the LUT associated with each node of the first through fourth nodes (102a-102d). Further, the control circuitry (104) may be configured to generate a node mapping based on the credentials received from each node of the first through fourth nodes (102a-102d). The node mapping may enable the control circuitry (104) to identify a placement and/or location of each node of the plurality of nodes (102) with respect to each other in the wireless mesh network. Furthermore, the control circuitry (104) may be configured to determine a node hop count associated with each node of the first through fourth nodes (102a-102d) based on the generated node mapping. In an embodiment, the node hop count may be equal to a number of hops that a message may take to reach from the control circuitry (104) to a destination node (e.g., the first through fourth nodes (102a-102d)). The control circuitry (104) may be further configured to determine a response time (RT) associated with each node of the first through fourth nodes (102a-102d) based on the generated node mapping. For example, if a hop count required to transmit a message from the control circuitry (104) to the first node (102a) is equal to 3, then the response time (RT) associated with first node (102a) may be proportional to a time duration of 3 hop counts. Further, the control circuitry (104) may be configured to generate a routing path for each node of the plurality of nodes (102) based on the node mapping. In an example, the control circuitry (104) may be configured to generate the routing path from the control circuitry (104) to the first through fourth nodes (102a-102d) and in between the first through fourth nodes (102a-102d). The routing path may facilitate in reducing the congestion in the wireless mesh network working on the flooding method. As, all nodes of the plurality of nodes (102) are mapped wirelessly, therefore a requirement of pre knowledge of placements of the nodes of the plurality of nodes (102) is eliminated. Further, the control circuitry (104) may be configured to manage the flooding in the wireless mesh network by optimizing the hop counts and response times (RTs) for each message that goes out of each node of the plurality of nodes (102).

In an embodiment, the control circuitry (104) may be further configured to implement time division multiplexing with the plurality of nodes (102) in the wireless mesh network. For example, the control circuitry (104) may be configured to allocate time slots to each node of the plurality of nodes (102) such that each node of the plurality of nodes (102) may communicate with the control circuitry (104) only during the allocated time slots. In an embodiment, reach node of the plurality of nodes (102) may be configured to generate a time slot request for additional time slots. Further, each node of the plurality of nodes (102) may be configured to provide the time slot request to the control circuitry (104) over the communication network (106). In an embodiment, the control circuitry (104) may be configured to allocate additional time slots to each node of the plurality of nodes (102) based on the time slot request. The implementation of the time division multiplexing may facilitate in reducing the congestion in the wireless mesh network working on the flooding method. In some embodiment, the control circuitry (104) may be configured to implement throttling to reduce congestion in the wireless mesh network. In an embodiment, the control circuitry (104) may be configured to implement the throttling in combination with the time division multiplexing to reduce the congestion. In such scenario, the control circuitry (104) may be configured to send commands to some of the nodes of the plurality of nodes (102) to reduce the data transmission rate based on a processing load of the control circuitry (104). In some embodiment, when a plurality of control circuitries (similar to the control circuitry (104)) are implemented in the system (100), the congestion may be reduced by allowing the closest control circuitry (104) of the plurality of control circuitries to communicate with the nodes of the plurality of nodes (102).

In an embodiment, the control circuitry (104) may be further configured to allocate an output transmission power to each node of the plurality of nodes (102) based on the generated node mapping. In an embodiment, a dynamic change of the output transmission power of each node of the first through fourth nodes (102a-102d) may allow the communication network (106) to not congest other networks nearby. The control circuitry (104) may be configured to allocate the output transmission power such that each node of the plurality of nodes (102) can be set to just transmit at enough power to establish reliable communication with the communication network (106).

The first through fourth nodes (102a-102d) may be configured to receive a health message from each of the neighboring nodes at a predefined time interval. In an example, the first node (102a) may be configured to receive a health message associated with the second node (102b), from the second node (102b) at the predefined time interval. Similarly, the first node (102a) may be configured to receive a health message associated with each of the neighboring nodes of the plurality of nodes (102) at the predefined time interval. The health message may include the RSSI of the associated neighboring nodes and the address of the associated neighboring nodes. In an embodiment, the predefined time interval may be in a range of 30 seconds to 1 minute. It will be apparent to a person skilled in the art that the predefined time interval is assumed to be in the range of 30 seconds to 1 minute to make the illustrations concise and clear and should not be considered as a limitation of the present disclosure. In various other embodiments, the predefined time interval can include any range of time interval, without deviating from the scope of the present disclosure.

The first through fourth nodes (102a-102d) may be configured to match the node address of the received message with the node address stored in the LUT of the first through fourth memories (108a-108d). When the node address is matched, the first through fourth nodes (102a-102d) may be configured to compare the RSSI of the received message with the RSSI stored corresponding to the matched node address. In an exemplary scenario, if the first through fourth nodes (102a-102d) determines that the RSSI of the received message is matched with the RSSI stored corresponding to the matched node address, then the first through fourth nodes (102a-102d) may continue receiving the health message from the one or more neighboring nodes. In another exemplary scenario, if the first through fourth nodes (102a-102d) determines that the RSSI of the received message is unmatched with the RSSI stored corresponding to the matched node address, then the first through fourth nodes (102a-102d) may be configured to generate error signals. In an embodiment, each node of the plurality of nodes (102) may be further configured to generate error signals when the health message is received after an expiration of the predefined time interval. Further, the first through fourth nodes (102a-102d) may be configured to transmit the error signals to the control circuitry (104).

In an embodiment, the control circuitry (104), in response to the error signals may generate a second initiation signal. The control circuitry (104) may be further configured to transmit the second initiation signal to a node (e.g., the first through fourth nodes 102a-102d) at which the RSSI of the received message is unmatched with the RSSI stored corresponding to the matched node address. The second initiation signal may enable the node (e.g., the first through fourth nodes 102a-102d) to remap the neighboring nodes by generating the first through fourth queries (QE1-QE4), as discussed above.

The system (100) may further include a cloud storage (112) that may be communicably coupled to the control circuitry (104). In an embodiment, the cloud storage (112) and the control circuitry (104) may be communicatively coupled to each other via the communication network (106). In other embodiments, the cloud storage (112) and the control circuitry (104) may be communicably coupled through separate communication networks established therebetween. In an embodiment, the control circuitry (104) may be configured to store data associated with the system (100) to the cloud storage (112) and retrieve data associated with the system (100) from the cloud storage (112). The cloud storage (112) may be a network of computers, a software framework, or a combination thereof, that may provide a generalized approach to create a cloud storage implementation. Examples of the cloud storage (106) may include, but are not limited to, any non-transient and tangible machine that can execute a machine-readable code, cloud-based servers, distributed server networks, or a network of computer systems. The cloud storage (112) may be realized through various web-based technologies such as, but not limited to, a Java web-framework, a .NET framework, a personal home page (PHP) framework, or any web-application framework. The cloud storage (112) may be maintained by a storage facility management authority or a third-party entity that facilitates congestion reduction operations of the system (100).

FIG. 2 illustrates a flowchart of a method (200) for reducing congestion in the access control wireless mesh network using the system (100) of FIG. 1, in accordance with an embodiment of the present disclosure.

At step (202), the control circuitry (104) of the system (100) transmits a read request to each node of the plurality of nodes (102).

At step (204), the control circuitry (104) receives, in response to the read request, from each node of the plurality of nodes (102), the plurality of credentials associated with the one or more neighboring nodes.

At step (206), the control circuitry (104) generates a node mapping based on the received plurality of credentials.

At step (208), the control circuitry (104) generates a routing path for each node of the plurality of nodes (102) based on the node mapping.

As will be readily apparent to those skilled in the art, the present embodiment may easily be produced in other specific forms without departing from its essential characteristics. The present embodiment are, therefore, to be considered as merely illustrative and not restrictive, the scope being indicated by the claims rather than the foregoing description, and all changes which come within therefore intended to be embraced therein.

What is claimed is:

1. A system (100) to reduce congestion in an access control wireless mesh network, the system (100) comprising:

a plurality of nodes (102) such that each node of the plurality of nodes (102) is coupled to one or more neighbouring nodes, and configured to store a mapping between a plurality of credentials associated with each neighbouring node of the one or more neighbouring nodes;

wherein each node of the plurality of nodes (102) is configured to:

(i) receive a health message generated by each neighboring node of the one or more neighboring nodes, wherein the health message comprises a node address and a Received Signal Strength Indicator (RSSI) associated with each neighbouring node of the one or more neighboring nodes;

(ii) match the RSSI associated with the health message with the plurality of credentials stored in each node of the plurality of nodes (102); and (iii) generate an error signal based on a mismatch between the RSSI associated with the health message and the RSSI associated with the plurality of credentials;

control circuitry (104) that is coupled to each of the plurality of nodes (102), and configured to:

allocate a predefined time slot to each node of the plurality of nodes (102) such that each node of the plurality of nodes (102) communicates with the control circuitry (104) at the predetermined time slot;

generate a second initiation signal based on the error signal and provide the second initiation signal to the corresponding node of the plurality of nodes (102) such that, in response to the second initiation signal, the corresponding node of the plurality of nodes (102) retrieves the node addresses of each neighbouring node of the one or more neighbouring nodes;

transmit a read request to each node of the plurality of nodes (102);

receive, in response to the read request, from each node of the plurality of nodes (102), the plurality of credentials associated with the one or more neighboring nodes;

generate a node mapping based on the received plurality of credentials;

allocate an output transmission power to each node of the plurality of nodes (102) based on the generated node mapping; and generate a routing path for each node of the plurality of nodes (102) based on the node mapping.

2. The system (100) as claimed in claim 1, wherein the mapping between the plurality of credentials comprises the RSSI mapped with the node address of each neighbouring node of the one or more neighbouring nodes.

3. The system (100) as claimed in claim 2, wherein each node of the plurality of nodes (102) is configured to retrieve the node address of each neighbouring node of the one or more neighbouring nodes.

4. The system (100) as claimed in claim 3, wherein the control circuitry (104) is further configured to generate and transmit a first initiation signal to each node of the plurality of nodes (102), and in response to the first initiation signal, each node of the plurality of nodes (102) retrieves the node address of each neighbouring node of the one or more neighbouring nodes.

5. The system (100) as claimed in claim 1, wherein the control circuitry (104) is further configured to determine, based on the node mapping, a hop count and a response time associated with each node of the plurality of nodes (102).

6. The system (100) as claimed in claim 1, wherein each node of the plurality of nodes (102) is further configured to generate a query such that the query is transmitted multiple with a predefined hop count, wherein the predefined hop count is 1.

7. The system as claimed in claim 1, wherein each node of the plurality of nodes (102) is configured to generate an error signal when the health message is received after an expiration of a predefined time interval.

8. The system as claimed in claim 1, wherein each node of the plurality of nodes (102) is configured to generate and provide a time slot request for additional time slots, to the control circuitry (104).

9. The system as claimed in claim 8, wherein the control circuitry (104) is further configured to allocate the additional time slots to each node of the plurality of nodes (102) based on the time slot request.

10. A method to reduce congestion in an access control wireless mesh network, the method comprising steps of:

generating and transmitting, by way of a control circuitry (104) of a system (100), a read request comprising a first initiation signal to each node of the plurality of nodes (102);

retrieving, by way of each node of the plurality of nodes (102) a node address of each neighbouring node of the one or more neighbouring nodes;

receiving, by way of the control circuitry (104), in response to the read request, from each node of the plurality of nodes (102), the plurality of credentials associated with the one or more neighboring nodes;

generating, by way of the control circuitry (104), a node mapping based on the received plurality of credentials;

determining, by way of the control circuitry (104), based on the node mapping, a hop count and a response time associated with each node of the plurality of nodes (102); and generating, by way of the control circuitry (104), a routing path for each node of the plurality of nodes (102) based on the node mapping.

11. A system (100) to reduce congestion in an access control wireless mesh network, the system (100) comprising:

a plurality of nodes (102) such that each node of the plurality of nodes (102) is coupled to one or more neighbouring nodes, and configured to store a mapping between a plurality of credentials associated with each neighbouring node of the one or more neighbouring nodes;

wherein each node of the plurality of nodes (102) is configured to:

(i) receive a health message generated by each neighboring node of the one or more neighboring nodes, wherein the health message comprises a node address and a Received Signal Strength Indicator (RSSI) associated with each neighboring node of the one or more neighboring nodes;

(ii) match the RSSI associated with the health message with the plurality of credentials stored in each node of the plurality of nodes (102); and (iii) generate an error signal when the health message is received after an expiration of a predefined time interval; and control circuitry (104) that is coupled to each of the plurality of nodes (102), and configured to:

allocate a predefined time slot to each node of the plurality of nodes (102) such that each node of the plurality of nodes (102) communicates with the control circuitry (104) at the predetermined time slot;

generate a second initiation signal based on the error signal and provide the second initiation signal to the corresponding node of the plurality of nodes (102) such that, in response to the second initiation signal, the corresponding node of the plurality of nodes (102) retrieves the node addresses of each neighbouring node of the one or more neighbouring nodes;

transmit a read request to each node of the plurality of nodes (102);

receive, in response to the read request, from each node of the plurality of nodes (102), the plurality of credentials associated with the one or more neighboring nodes;

generate a node mapping based on the received plurality of credentials;

allocate an output transmission power to each node of the plurality of nodes (102) based on the generated node mapping; and generate a routing path for each node of the plurality of nodes (102) based on the node mapping.

12. The system (100) as claimed in claim 11, wherein the mapping between the plurality of credentials comprises the RSSI mapped with the node address of each neighbouring node of the one or more neighbouring nodes.

13. The system (100) as claimed in claim 12, wherein each node of the plurality of nodes (102) is configured to retrieve the node address of each neighbouring node of the one or more neighbouring nodes.

14. The system (100) as claimed in claim 13, wherein the control circuitry (104) is further configured to generate and transmit a first initiation signal to each node of the plurality of nodes (102), and in response to the first initiation signal, each node of the plurality of nodes (102) retrieves the node address of each neighbouring node of the one or more neighbouring nodes.

15. The system (100) as claimed in claim 11, wherein the control circuitry (104) is further configured to determine, based on the node mapping, a hop count and a response time associated with each node of the plurality of nodes (102).

16. The system (100) as claimed in claim 11, wherein each node of the plurality of nodes (102) is further configured to generate a query such that the query is transmitted multiple with a predefined hop count, wherein the predefined hop count is 1.

17. The system as claimed in claim 11, wherein each node of the plurality of nodes (102) is configured to generate an error signal based on a mismatch between the RSSI associated with the health message and the RSSI associated with the plurality of credentials.

18. The system as claimed in claim 11, wherein each node of the plurality of nodes (102) is configured to generate and provide a time slot request for additional time slots, to the control circuitry (104).

19. The system as claimed in claim 18, wherein the control circuitry (104) is further configured to allocate the additional time slots to each node of the plurality of nodes (102) based on the time slot request.

* * * * *